(12) United States Patent
Inman et al.

(10) Patent No.: US 6,580,060 B1
(45) Date of Patent: Jun. 17, 2003

(54) FOOT WARMER MAT ADAPTED FOR USE IN AN AUTOMOTIVE VEHICLE

(76) Inventors: Derrick M. Inman, 14935 Longacre, Detroit, MI (US) 48227; Carla B. Inman, 14935 Longarce, Detroit, MI (US) 48227

( * ) Notice: Subject to any disclaimer, the term of this patent is extended or adjusted under 35 U.S.C. 154(b) by 0 days.

(21) Appl. No.: 10/121,021

(22) Filed: Apr. 11, 2002

Related U.S. Application Data

(60) Provisional application No. 60/285,046, filed on Apr. 19, 2001.

(51) Int. Cl.[7] .................................................. H05B 3/54
(52) U.S. Cl. ..................... 219/528; 219/217; 219/544; 219/549; 392/380; 34/233
(58) Field of Search ................................. 219/528, 211, 219/212, 217, 529, 544, 545, 546, 549; 392/365, 367, 373, 380, 384, 385; 607/111; 34/233, 237, 523

(56) References Cited

U.S. PATENT DOCUMENTS

| | | | | |
|---|---|---|---|---|
| 3,745,305 A | * | 7/1973 | Reed et al. | 219/217 |
| 3,894,213 A | * | 7/1975 | Agarwala | 219/528 |
| 4,449,034 A | * | 5/1984 | Taniguchi | 219/217 |
| 4,782,604 A | * | 11/1988 | Gonzalez | 34/233 |
| 4,820,903 A | * | 4/1989 | Ishida | 219/217 |
| 4,844,072 A | * | 7/1989 | French et al. | 219/528 |
| 4,933,038 A | * | 6/1990 | Liu | 219/528 |
| 5,578,230 A | * | 11/1996 | Eldon | 219/211 |
| 5,826,347 A | * | 10/1998 | Olivares-Gonzalez de Serrano et al. | 34/233 |
| 5,866,881 A | * | 2/1999 | Jones, III | 219/211 |
| 6,393,717 B1 | * | 5/2002 | Santos et al. | 392/380 |

* cited by examiner

Primary Examiner—Teresa Walberg
Assistant Examiner—Fadi H. Dahbour
(74) Attorney, Agent, or Firm—John R. Benefiel

(57) ABSTRACT

A foot warmer mat including an electrical heater element embedded in the mat combined with a heater air circulation emanating from a detachable hood at one end of the mat. A vibrator is also embedded in the mat to stimulate the soles of a user's feet. An automotive electrical adapter is used to power the electrical components to allow controlled activation by a vehicle passenger.

7 Claims, 1 Drawing Sheet

FOOT WARMER MAT ADAPTED FOR USE IN AN AUTOMOTIVE VEHICLE

CROSS REFERENCE TO RELATED APPLICATIONS

This application claims the benefit of U.S. provisional Ser. No. 60/285,046, filed Apr. 19, 2001.

BACKGROUND OF THE INVENTION

This invention concerns foot warming devices. Many people have difficulties in keeping their feet warm when seated for long periods, particularly where cool temperatures at floor level prevail, such as in the rear seat of an automotive vehicle during cold weather.

Keeping the feet comfortably warm is difficult for many people due to poor circulation to the feet especially when the person is physically at rest for extended periods.

The heating systems in most cars do not keep the floor warm in the rear seat area. There have heretofore been proposed bulky and complicated arrangements for extending the vehicle heater system to the rear seat area. Also, auxiliary heaters have been proposed to solve this problem, but these also have been too bulky to be practical as a foot warmer. There have also been proposed electrically heated mats. However, within practical power limits for this application, such mats are relatively ineffective since only limited heat is conducted into the soles of the feet.

Heated massage pads have also been proposed for therapeutic use, but these are not adequate for cold weather foot warming nor designed for use in automotive vehicle passenger spaces.

It is the object of the present invention to provide a compact foot warmer which will be effective at keeping the user's feet warm even when the user is seated for long periods in cool temperature conditions in an automobile.

SUMMARY OF THE INVENTION

The above object and others which will become apparent upon a reading of the following specification and claims are achieved by a foot warmer mat which combines an electrically heated mat with a fan motor and heater element creating a flow of warm air over the top of the heated mat so as to insure adequate warming of the user's feet even when using relatively low wattage heaters, since heat is efficiently applied to all parts of the user's feet. In addition, a vibrator unit within the mat stimulates blood circulation to the user's feet to reduce the need for external warming of the feet. The mat is of a compact construction and adapted to be powered from an auto electrical system to be well suited for automotive use.

DETAILED DESCRIPTION

Figure 1:
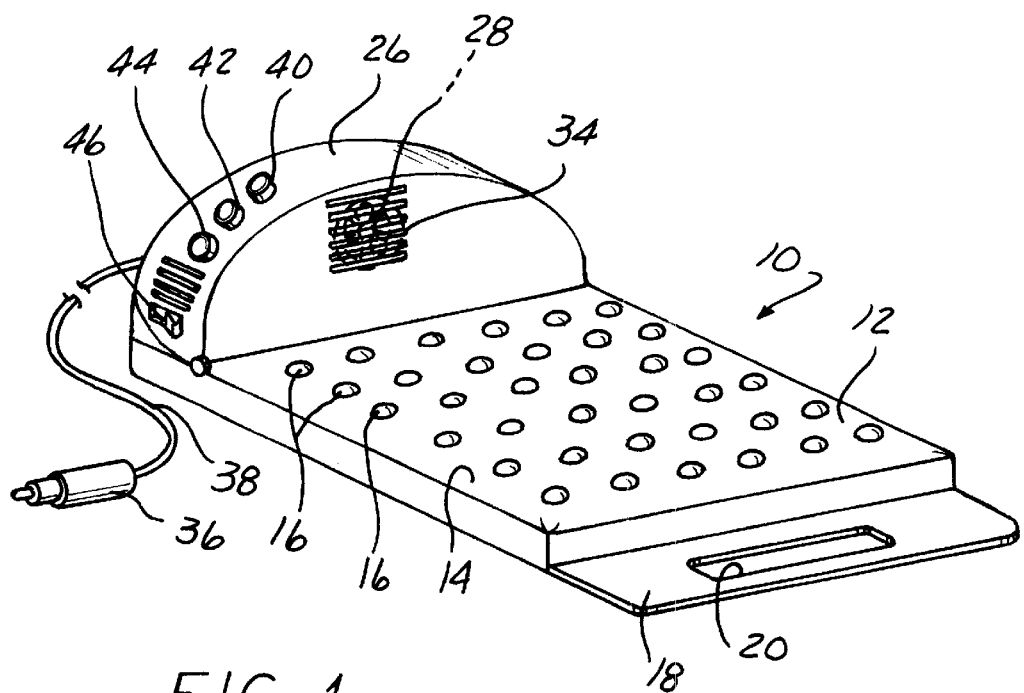
FIG. 1 is a perspective view of a foot warmer mat according to the present invention.
Figure 2:
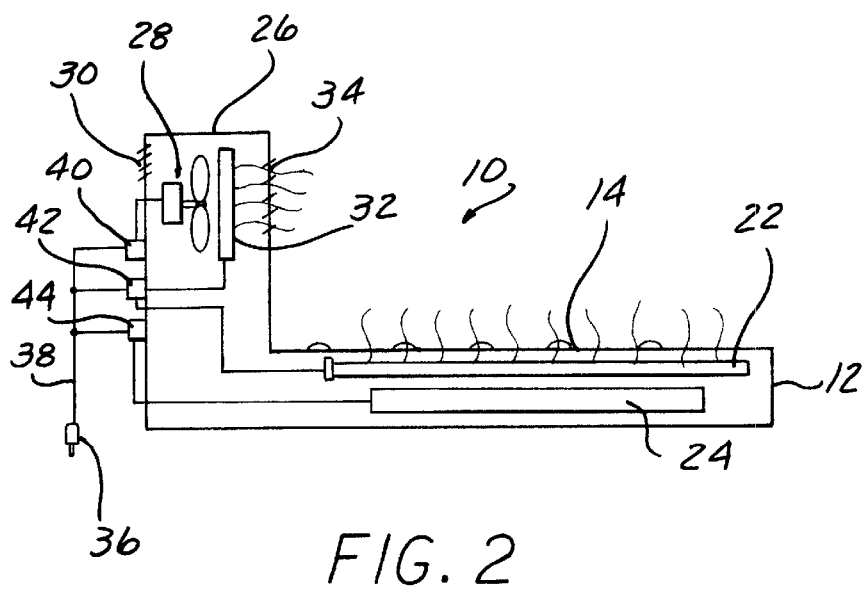
FIG. 2 is a diagrammatic representation of the components of the foot warmer mat according to the present invention.

In the following detailed description, certain specific terminology will be employed for the sake of clarity and a particular embodiment described, but it is to be understood that the same is not intended to be limiting and should not be so construed inasmuch as the invention is capable of taking many forms and variations within the scope of the appended claims.

Referring to the drawings, a foot warmer mat 10 according to the present invention is shown, and includes a generally planar rectangular padded mat 12 sized to accommodate the user's feet to be placed thereon. The mat 10 has an outer skin preferably constructed of a suitable durable flexible elastomeric material. A foam plastic filler provides the padding. The upper surface 14 may have molded protuberances 16 to aid in stimulating the soles of the user's feet when a vibrating unit describe below is activated.

A tab 18 having an opening 20 can be molded to one end of the mat 12 to provide a convenient carrying handle.

The mat 12 is of sufficient thickness to accommodate an electrical resistance heating element 22 disposed close to the upper surface 14 and a vibrator unit 24 is positioned below the heating element 22.

An upright curved hood 26 is detachably mounted at one end of the mat 12 and houses an air circulation fan motor 28 for drawing in air through an intake vent 30, passing the same across an electrical resistance heating element or grid 32 and thence is directed outwardly through a vent 34 over the region just above the upper surface 14 of the mat 12.

The electrical components are powered by an electric power circuit including an auto outlet adapter plug 36 connected via a cable 38 to an array of control switches 40, 42, 44 mounted on the hood 26 for individual control of the fan motor 28, heater elements 32, and vibrator 24.

Switch 42 can also provide a thermostatic control as well.

A main on/off switch 46 could also be provided.

This combination of heating devices insures that a user's fee can be kept comfortably warm with an efficient use of electrical power, since all parts of the feet are exposed to warmed air or the warmed surface of the mat 12, and the vibrator 24 enhances blood circulation to reduce the need for external heat necessary to keep the feet warm.

Thus, the mat 10 is compact, and well adapted for automotive use, but can be removed for use elsewhere. In that instance, a standard AC adapter (not shown) can be provided to allow the mat to be plugged into a wall outlet.

What is claimed is:

1. A foot warmer mat comprising:

a generally planar mat;

a resistance heater element embedded in said mat;

an upright hood at one end of said mat;

an air circulation fan motor mounted within said hood;

an electrical heater element disposed to receive air flow produced by said fan motor, said air flow heated thereby;

an outlet vent directing heating air flow across said mat to heat a user's feet resting thereon;

an electrical power circuit for energizing both said heater elements and said fan motor, including at least one switch for controlling energization of said circuit.

2. The foot warmer mat according to claim 1 further including a vibrator embedded in said mat and also powered by said electrical power circuit.

3. The foot warmer mat according to claim 2 further including protuberances formed on the upper surface of said mat to aid in stimulation of the soles of a user's fee by said vibrator.

4. The foot warmer mat according to claim 2 wherein said electrical supply circuit includes a series of switches for individually controlling said heater elements, vibrator, and fan motor.

5. The foot warmer mat according to claim 1 wherein said hood is detachably mounted to one end of said mat.

6. The foot warming mat according to claim 1 wherein a carrying handle is fixed at an opposite end of said mat.

7. The foot warmer mat according to claim 1 wherein said electrical power circuit includes an auto adapter plug an electrical cable connected thereto.

\* \* \* \* \*